Oct. 20, 1942.  E. K. CLARK ET AL  2,299,462
SADIRON THERMOSTAT ADJUSTING MEANS
Filed March 4, 1941
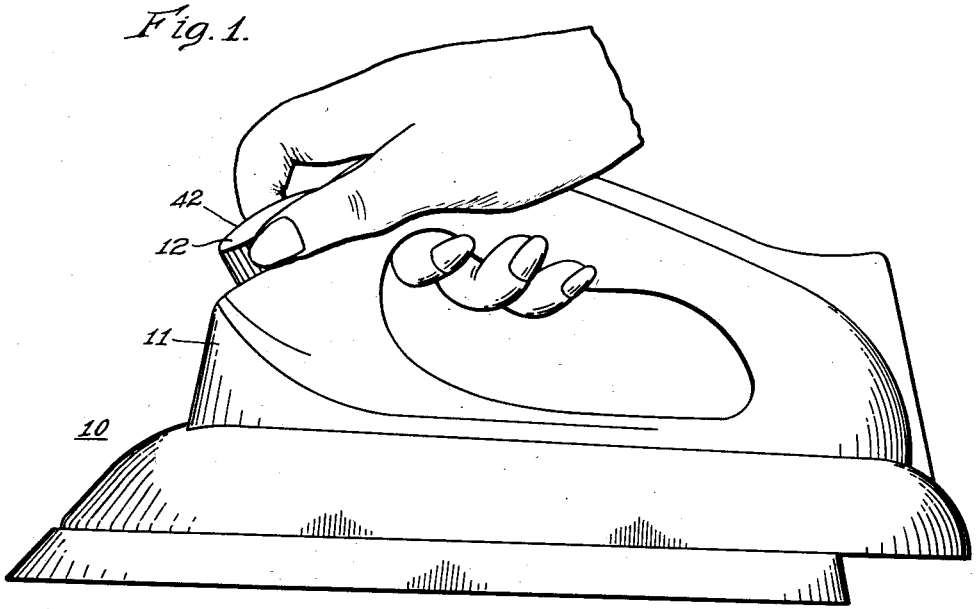
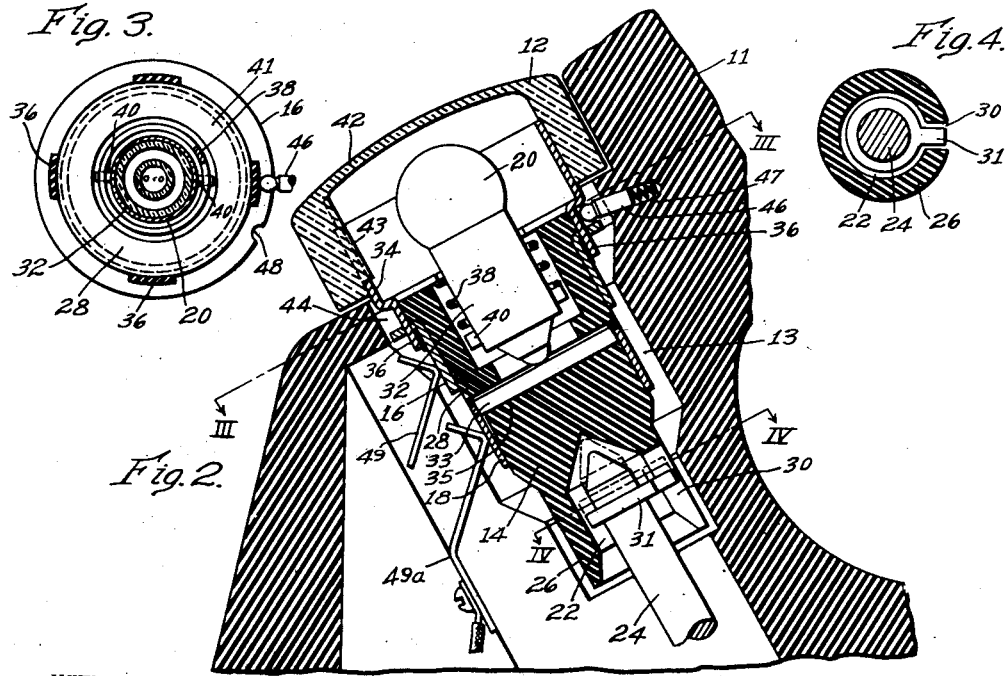
WITNESSES:
INVENTORS
Earl K. Clark and
Joseph R. Heilman.
BY
ATTORNEY Patented Oct. 20, 1942

2,299,462

UNITED STATES PATENT OFFICE 2,299,462

SADIRON THERMOSTAT ADJUSTING MEANS

Earl K. Clark and Joseph Raymond Heilman, Mansfield, Ohio, assignors to Westinghouse Electric & Manufacturing Company, East Pittsburgh, Pa., a corporation of Pennsylvania Application March 4, 1941, Serial No. 381,676

2 Claims. (Cl. 177—311)

Our invention relates to sadirons and, more particularly, to a control knob structure which is used for adjusting the thermostat thereof.

It is an object of our invention to provide an adjusting knob for a sadiron thermostat which is conveniently positioned within the sadiron handle.

It is a further object of our invention to provide a sadiron thermostat-adjusting control knob which is rotatively positioned within a complementary shaped aperture and which, while being rotatable with respect to the handle, does not move along the longitudinal axis of such knob.

It is a further object of our invention to provide a thermostat adjusting control knob which has means located therein for receiving the adjusting screw of the sadiron thermostat and which is connected to the adjusting screw so that as the control knob and thermostat screw are rotated by an operator, the adjusting screw may move longitudinally with respect to the control knob.

It is another object of our invention to provide a sadiron thermostat adjusting control knob having a pilot or signal lamp therein which indicates when the iron is being energized.

Other objects of our invention will either be pointed out specifically in the course of the following description of a device embodying our invention, or will be apparent from such description.

In the accompanying drawing:

Figure 1 is a side elevational view of a sadiron embodying our invention;

Fig. 2 is an enlarged fragmentary sectional view, taken along the longitudinal axis of the sadiron handle, showing our knob structure; and Figs. 3 and 4 are sectional views taken along the lines III—III and IV—IV, respectively, of Fig. 2.

Referring to the accompanying drawing, in which like reference characters indicate like parts in the several figures, a sadiron 10 is illustrated having a handle 11 and a thermostat control knob structure 12 which rotatively fits within the handle 11 and which comprises a main body member 14, a plurality of current collecting and conducting sleeves 16 and 18, a signal lamp 20 electrically associated with such sleeves and an upwardly extending aperture 22 in the lower portion of the main body member 14 for receiving a thermostat adjusting screw 24.

The sadiron structure 10, including the handle 11, may be of any desired structure in lieu of the structure illustrated in Fig. 1, since this application does not pertain to the sadiron structure per se. A thermostat, not shown, is located within the sadiron structure in any well-known manner to control the heat output of such sadiron. The control knob 12 for such thermostat is, in this instance, rotatively positioned upon the sadiron handle 12 and is connected with the thermostat so as to selectively adjust the operation of such thermostat, in a manner hereinafter described.

The thermostat adjusting or control knob structure 12 embodies a main body member 14. This member 14 is substantially an elongated cylindrical member having a lower relatively small diameter portion 26 and an upper relatively large diameter portion 28. This member 14 is, in this instance, formed of a suitable phenolic resinuos material so as to be easily and inexpensively manufactured and to act as an electrical insulator. An upwardly extending cylindrically or cup-shaped aperture 22 is formed within the lower portion 26 of the handle member 14 for receiving the adjusting screw 24 of the thermostat. In addition, a notch or slot-like opening 30 (see Figs. 2 and 4) is positioned adjacent the aperture 22 for receiving a key member 31 as hereinafter described. A downwardly extending cylindrically or cup-shaped aperture 32 is positioned within the enlarged portion 28 of the member 14 for receiving a signal lamp 20. In addition, there is a small drilled diametrically extending aperture 35 connecting the aperture 32 with the side of the member 14 for receiving a cylindrical electrical conductor 33, for a purpose hereinafter described.

The sleeve 18 is positioned about the relatively enlarged portion 28 of the member 14 near the lower portion thereof. The sleeve 18 is electrically attached to the cylindrical conductor 33 which passes through the aperture 35, say, by being soldered thereto, to provide the necessary electrical connection between the lamp 20 and sleeve 18. The sleeve 16 is positioned about the upper portion of the enlarged portion 28 of member 14 and has an outwardly extending flange about its upper edge. The sleeve 16 is electrically connected to the resilient member 38 positioned within the aperture 32 to complete the electrical connection to the lamp 20, as hereinafter described.

An upwardly extending cup-shaped member 34 is located about the upper end of the member 14. A plurality of depending fingers 36 are punched out of the bottom portion of the member 34 so as to fit tightly against the upper edge of the member 14. These fingers 36 pass through the flange portion of the upper sleeve 16 and are rigidly attached to the sleeve 16, say by means of soldering, or the like, so as to rigidly attach the cup-shaped member 34 to the member 14.

A helically coiled spring-like member 38 is positioned within the upper aperture 32 of member 14 and engages with the exterior bayonet projections 40 of the lamp 20 to provide electrical conducting means from the upper sleeve 16 to the lamp 20, through the cup-shaped member 34. The upper end of the spring 38 is preferably attached to member 34, which holds the spring-like member 38 within the aperture 32. The lamp 20 is retained within the aperture 32 by having the prongs 40, attached to the lamp 20, fit between adjacent whorls of the spring 38, the cooperation of which functions as a threaded engagement therebetween. However, spring 38 when the lamp is in its operating position, biases the lamp 20 downwardly so as to ensure proper engagement of the lamp with conductor 33.

A translucent covering member 42 is positioned upon the cup-shaped member 34 so as to cover the lamp 20. An indicating insignia (not shown) may be inscribed on member 42 for indicating the position of the control knob and the thermostat. It is to be understood that the indicating insignia positioned upon the translucent member 42 may be of any desired character or arranged in any suitable manner. The member 42 has a slip fit with the casing 34 and has a suitable inwardly extending key portion 43 for fitting within cooperating slots in the cup-shaped member 34 to prohibit any relative rotative movement therebetween.

The outer portion of the bottom of cup-shaped member 34 cooperates with the outwardly extending flange portion of the upper sleeve 16 to provide a horizontal outwardly extending circular notch 44. This exteriorly opened notch 44 is adapted to receive a hidden pin-like member 46 which is positioned within the handle 11 and biased outwardly by spring 47 (see Figs. 2 and 3). The cooperation of pin 46 with knob 12 by fitting within notch 44 prevents any longitudinal movement of the control knob 12 with respect to handle 11. A suitable notch 48 (see Fig. 3) is cut within the outwardly extending flange of sleeve 16 to permit the handle 12 to be removed from the complementary shaped aperture 13 in handle 11. The notch 48 is positioned within the outwardly extending flange at such a place that the handle must be turned to the high position of the thermostat before such handle may be longitudinally removed from the opening 13 in the handle 11. However, when it is desired to remove knob 12 such knob must be forced upwardly so as to force the pin 46 inwardly whereupon the knob 12 may be easily removed from the handle.

Suitable flexible current conducting members 49 and 49a are rigidly attached to the handle 11, in any suitable manner (not shown), and are adapted to engage the sleeves 16 and 18, respectively, to convey current to the lamp 20. The fingers 49 and 49a are electrically connected to the heating element, not shown, of the sadiron 10 so as to energize the signal lamp 20 when the heating element of the sadiron is energized.

The adjusting screw 24 is, in this instance, inclined to the plane of the lower or ironing surface of the sadiron and is mechanically connected to the bimetallic element of the thermostat, not shown, in any well-known manner. As is the case with most thermostatic adjusting screws, such screws move along their longitudinal axis as they are rotated from, say, the off to the high position. The adjusting screw 24, in this instance, has a key member 31 (see Figs. 2 and 4) which is rigidly attached thereto and which fits within the slot 30 in the aperture 22 so as to prevent any substantial relative rotative movement between the control knob 12 and the adjusting screw 24.

It follows that due to pin 46 cooperating within the annular notch 44, such control knob, while being free to rotate about its longitudinal axis, is prevented from any relative longitudinal movement with respect to the handle 11. However, inasmuch as the adjusting screw 24 has a longitudinal movement along its longitudinal axis responsive to the rotative movements of the control knob 12, such screw must move longitudinally with respect to the control knob as illustrated by the dotted lines in Fig. 2. Apertures 22 and slot 30 permit this relative movement of the adjusting screw 24 with respect to the control knob 12.

The control knob 12 is thus adapted to remain fixed with respect to the exterior configuration of the handle 11 and accordingly provides a pleasing structure which remains uniform in its position and appearance. Further, by being fixed in its position with respect to the handle 11, such control knob 12 prevents any contaminating or foreign matter from entering into the fixed cavity or opening 13 in the handle 11 and from becoming engaged with the heating element or thermostat (not shown).

It, therefore, follows that we have provided a control knob which, by means of the conducting fingers 49 and 49a, indicates, through the medium of the signal lamp 20, when the heating element (not shown) is energized and provides indicating means, not shown, upon the cover plate 42 of the control knob 12 for enabling an operator to selectively position such control knob and the thermostat, so that the heating element of said sadiron controlled thereby will produce the necessary heat required for the ironing operation.

Various modifications may be made in the device embodying our invention without departing from the spirit and scope thereof, and we desire, therefore, that only such limitations shall be placed thereon as are imposed by the prior art and set forth in the appended claims.

We claim as our invention:

1. In a removable sadiron thermostat adjusting control knob which is rotatably mounted within a complementary opening in the sadiron handle for cooperation with the adjusting screw of the iron thermostat and which embodies visible signaling means, the combination of an elongated cylindrical member having a lower relatively small diameter portion and an upper relatively large diameter portion, a signal lamp, said upper portion having a downwardly extending opening for removably receiving the signal lamp, a lower and an upper electrical conductor sleeve positioned upon and attached to the large diameter portion of said member for receiving electrical contact fingers, means for electrically connecting said sleeves with the lamp, said upper sleeve having an outwardly extending flange, an upwardly extending casing projecting upwardly from the cylindrical member and having depending fingers for fitting closely about the upper portion of the cylindrical member, said casing cooperating with the flange of the upper sleeve to form a ring-like channel, key means carried by the sadiron handle projecting within the channel for retaining the cylindrical member within the opening therein, and a translucent cap-like member fitting over and removably attached to the casing and disposed about said signal lamp for indicating the operating position of the thermostat, said small diameter portion having an upwardly extending cylindrical opening therein for removably receiving the adjusting screw of the thermostat and having a key receiving slot adjacent to the opening to permit a keyed connection between said knob and screw, whereby the control knob may be rotated to rotate the thermostat adjusting screw without any longitudinal movement of the knob with respect to the sadiron handle.

2. In a removable sadiron thermostat adjusting control knob which is rotatably mounted within a complementary opening in the sadiron handle for cooperation with the adjusting screw of the iron thermostat and which embodies visible signalling means, the combination of an elongated cylindrical member, a signal lamp, said member having a downwardly extending opening in its upper portion for removably receiving the signal lamp, a lower and an upper electrical conductor sleeve positioned upon and attached to the member for receiving electrical contact fingers, means for electrically connecting said sleeves with the lamp, said upper sleeve having an outwardly extending flange, an upwardly extending casing projecting upwardly from the cylindrical member, said casing cooperating with the flange of the upper sleeve to form a ring-like channel, key means carried by the sadiron handle projecting within the channel for retaining the cylindrical member within the opening in the handle, said control knob being translucent and fitting over and removably attached to the casing and disposed about said signal lamp for indicating the operating position of the thermostat, said cylindrical member having an upwardly extending opening within the lower portion thereof for removably receiving the adjusting screw of the thermostat, and means cooperating with said member and said adjusting screw for rotating said adjusting screw in response to the rotated movements of the control knob and permitting said adjusting screw to move axially with respect to said knob, whereby the knob remains axially fixed with respect to the sadiron handle.

EARL K. CLARK.
JOSEPH RAYMOND HEILMAN.